United States Patent Office 3,361,762
Patented Jan. 2, 1968

3,361,762
THIAZOCINES AND THEIR PREPARATION
Van R. Gaertner, Ballwin, Mo., assignor to Monsanto Company, St. Louis, Mo., a corporation of Delaware
No Drawing. Filed May 25, 1965, Ser. No. 458,739
18 Claims. (Cl. 260—327)

This application is a continuation-in-part of copending application Ser. No. 296,910, filed July 23, 1963, now matured to U.S. 3,236,837.

This invention is related to heterocyclic nitrogen and sulfur compounds. More particularly, this invention provides a novel group of heterocyclic nitrogen and sulfur compounds, and processes for preparing them.

It is an object of this invention to provide a new class of substituted heterocyclic nitrogen and sulfur-containing compounds.

It is a more specific object of this invention to provide a new class of saturated thiazocinediols.

It is another object of this invention to provide a process for preparing the saturated thiazocinediols.

Other objects, aspects, and advantages of this invention will become apparent from reading the description set forth hereinafter.

According to one aspect of this invention there is provided a new class of saturated thiazocinediols which are ring compounds containing hydroxyl substituents on ring carbon atoms thereof. These compounds may be described as having the structural formula

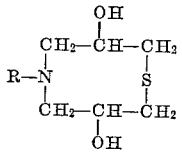

wherein R is selected from the group consisting of alkyl radicals having from 1 to 18 carbon atoms, cycloalkyl radicals having from 3 to 8 carbons, aryl hydrocarbon radicals having from 6 to 12 carbon atoms, aralkyl hydrocarbon radicals having from 7 to 12 carbon atoms, and said alkyl, aryl, and aralkyl radicals substituted with non-interfering groups such as halogen, lower alkyl, formyl, sulfonyl, lower alkoxyl, lower carboalkoxyl, lower acyl (—C(O)-alkyl), lower aroyl, N-lower alkyl-carbamoyl (—C(O)NHR), N,N-di-lower alkylcarbamoyl, and lower acyloxyl. In the above substituents "lower alkyl" means from 1 to about 6 carbon atoms, and "aroyl" means a phenyl ring-containing carbonyl radical containing not over about 10 carbon atoms.

These compounds may be named generically as hexahydro-2[H]-5-thi-1-azocine-3,7-diols. The "ocine" suffix is used herein to indicate an eight-membered ring containing nitrogen as a ring-forming element and the ring nitrogen is the number 1 atom in the ring. A few examples of compounds of this group are:

1 - tert - butyl - hexahydro - 2[H] - 5 - thi - 1 - azocine-3,7-diol,
1 - hexyl - hexahydro - 2[H] - 5 - thi - 1 - azocine - 3,7-diol, and
1 - (4 - butylphenyl) - hexahydro - 2[H] - 5 - thi - 1-azocine-3,7-diol.

Another aspect of this invention provides a process for preparing compounds of the types described above. According to the process a diglycidylamine of the formula

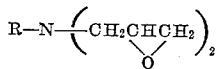

wherein R is as defined above is contacted and reacted with an alkali metal or alkaline earth metal sulfide, or hydrosulfide, or other at least partially water soluble sulfide, or with hydrogen sulfide, to form the hexahydro-2[H]-5-thi-1-azocine-3,7-diol type compound, in the presence of an hydroxyl-containing catalyst or solvent at a temperature of from about —20° C. to about 100° C.

The diglycidylamines used in the method of this invention may be prepared by reacting a primary amine of the formula R—NH₂ wherein R is as defined above with an epihalohydrin in sufficient amount to form a reaction product having the formula

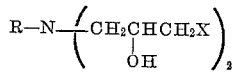

wherein R is as defined above, and X is a halogen selected from the group consisting of bromine, chlorine and iodine, in the presence of an hydroxyl-containing catalyst, and then treating the resulting bis(halopropanol)amine compound with an aqueous basic material selected from the group consisting of alkali metal and alkaline earth metal hydroxides, carbonates, and oxides in an amount sufficient to dehydrohalogenate the above reaction product, preferably in the presence of a dialkyl sulfoxide having from 1 to 4 carbon atoms in each alkyl radical such as dimethyl sulfoxide. When this reaction is completed the excess basic material may be removed from the resulting reaction product to prevent any deleterious side reaction. The process for preparing these diglycidylamines starting materials is described in detail in co-pending application Ser. No. 202,724, filed June 15, 1962, now matured to U.S. 3,278,561, which is incorporated herein by reference thereto in order to avoid undue length in the specification.

The primary amine used to make the N,N-diglycidylamine may be an alkylamine having from 1 to 18 carbon atoms in each alkyl group, but is preferably a lower alkylamine such as ethylamine, n-propylamine, isopropylamine, n-butylamine, isobutylamine, tert-butylamine, mixed amylamines, n- and isohexylamines, although the higher alkylamines such as 2-ethylhexylamine, nonylamine, decylamine, straight and branched chain dodecylamines, pentadecylamine and octadecylamine may be used. Aralkylamines such as benzylamine, 4-ethylbenzylamine, and 2-phenethylamine may be used. Useful arylamines include aniline, α- and β-naphthylamines and 4-biphenylylamine. Amines of the above described types having non-interfering substitutents may also be used. A non-interfering substituent is one which does not react under the conditions of this invention with the amino group or the glycidyl epoxide group involved in the formation of the compounds of the invention. Some such substituted alkyl, aryl, and aralkylamines which may be used are those substituted with halogen, lower alkyl, formyl, sulfonyl, lower alkoxyl, lower carboalkoxyl, aroyl, lower acyl, aroyloxyl, N-lower alkylcarbamoyl, i.e., groups of the formula —C(O)NHR″ where R″ denotes the lower alkyl, N,N-di-lower alkylcarbamoyl, and lower acyloxyl, i.e., groups of the formula —OC(O)R.

Examples of such substituted-R—NH₂ compounds which may be used as the amine from which to prepare the N,N-diglycidylamine reactants are 4-chloroaniline, 2,4-dibromoaniline, 3-iodoaniline, pentachloroaniline, 2-chloroethylamine, 4 - bromobutylamine, 2 - iodopropylamine, 3,5 - dichlorobenzylamine, 4 - chloro-α-naphthylamine, 3,3'-5,5'-tetrachloro-4-aminobiphenyl the o-, m-, and p-toluidines, 4-ethylanilines, the xylidines, 2-methyl-6-tert-butylaniline, p-aminobenzoic acid, metanilic acid, 3 - aminobenzaldehyde, 4 - methoxyaniline, 4-ethoxy-1-naphthylamine, 3,5-dimethoxyaniline, 6-methanesulfonyl-hexylamine, 4-benzenesulfonylaniline, 4-carbomethoxybutylamine, 4 - carboethoxyaniline, 5 - carbopropoxy-2- naphthylamine, 4-aminobenzoic acid, 4-aminobutyric acid, 4 - aminopropiophenone, 4 - amino-1-acetonaphthone, 3-benzoylpropylamine, 4-amino-N-ethylbenzamide, 3-acetoxyaniline.

The cycloalkylamines having from 3 to about 8 carbon atoms may also be used, e.g., cyclopropylamine, cyclobutylamine, cyclopentylamine, cyclohexylamine, 4-methylcyclohexylamine, cycloheptylamine and cyclooctylamine may be used as the amine used to make the N,N-diglycidylamine reactant.

In preparing the hexahydro-2[H]-5-thi-1-azocine-3,7-diol compounds of this invention the substituted N,N-diglycidylamine is reacted with an alkali metal sulfide or hydrosulfide or an alkaline earth metal, sulfide or hydrosulfide or other at least partially soluble sulfides which hydrolyze in water to give hydrogen sulfide, or with hydrogen sulfide. Any of the alkali metal sulfides, including lithium, sodium, potassium, rubidium, and cesium sulfides and hydrosulfides may be used. As a practical matter, however, because of cost and availability, sodium and potassium sulfides and hydrosulfides or hydrogen sulfide are preferred. Barium hydrosulfide, calcium sulfhydrate, are examples of alkaline earth metal sulfides and hydrosulfides which may be used.

Examples of hexahydro-2[H]-5-thi-1-azocine-3,7-diols of this invention and the reactants from which they are obtained are:

1-pentadecyl-hexahydro-2[H]-5-thi-1-azocine-3,7-diol obtained from N,N-diglycidylpentadecylamine and sodium sulfide;
1-(4-chlorophenyl)-hexahydro-2-[H]-5-thi-1-azocine-3,7-diol obtained from N,N-diglycidyl-4-chloroaniline and potassium hydrosulfide;
1-[4-(carbethoxy)phenyl]-hexahydro-2[H]-5-thi-1-azocine-3,7-diol obtained from N,N-diglycidyl-4-carbethoxyaniline and hydrogen sulfide;
1-cyclopentyl-hexahydro-2[H]-5-thi-1-azocine-3,7-diol obtained from N,N-diglycidylcyclopentylamine and strontium hydrosulfide;
1-(4-formylphenyl)-hexahydro-2[H]-5-thi-1-azocine-3,7-diol obtained from N,N-diglycidyl-4-formylaniline and calcium sulfhydrate;
1-(4-methoxyphenyl)-hexahydro-2[H]-5-thi-2-azocine-3,7-diol obtained from N,N-diglycidyl-4-methoxyaniline and potassium sulfide;
1-(4-carbomethoxynaphthyl)-hexahydro-2[H]-5-thi-1-azocine-3,7-diol obtained from N,N-diglycidyl-4-carbomethoxynaphthylamine and sodium sulfide;
1-[4-(N-ethylcarbamoyl)phenyl]-hexahydro-2-[H]-5-thi-1-azocine-3,7-diol obtained from N',N'-diglycidyl-4-amino N-ethylbenzamide and hydrogen sulfide;
1-[3-(N,N-dimethylcarbamoyl)phenyl]hexahydro-2-[H]-5-thi-1-azocine-3,7-diol obtained from 3-(N,N-diglycidylamino)-N,N-dimethylbenzamide;
1-(6-methanesulfonylhexyl)-hexahydro-2[H]-5-thi-1-azocine-3,7-diol obtained from N,N-diglycidyl-6-methanesulfonylhexylamine and potassium sulfide;
1-(3-propionoxyphenyl)-hexahydro-2[H]-5-thi-1-azocine-3,7-diol obtained from 3-(N,N-diglycidyl) aminophenyl propionate and sodium sulfide;
1-(3-benzoylpropyl)-hexahydro-2[H]-5-thi-1-azocine-3,7-diol obtained from N,N-diglycidyl-3-benzoylpropylamine and hydrogen sulfide; and
1-(4-acetonaphthyl)-hexahydro-2[H]-5-thi-1-azocine-3,7-diol obtained from N,N-diglycidyl-4-amino-1-acetonaphthone.

In preparing the saturated 5-thi-1-azocine-3,7-diols of this invention the N,N-diglycidylamines and alkali metal or alkaline earth metal sulfide or hydrosulfide, or hydrogen sulfide reactants are contacted in the presence of at least a trace amount of an hydroxyl-containing material, preferably a low molecular weight, volatile alkanol, such as methanol, ethanol, or propanol which can be used as solvent for the reaction mixture as well as the catalyst. The hydroxyl-containing material needed to start the reaction can be supplied in a variety of ways. For example, the small amount of water normally present in some commercially available solvents, such as hexane, heptane, etc. is sufficient to initiate the reaction; also, moisture present in the air is sufficient. However, water is not generally desired as a solvent for this reaction mixture. The hydroxyl-containing material can also be supplied by some of the reaction products since, as indicated above, these products contain hydroxyl groups. Thus the reaction is auto-catalytic. The hydroxyl-containing material can also be any other hydroxyl compound, a few simple examples of which are phenol, alkylene glycols such as ethylene glycol, propylene glycol, etc. The provision of the hydroxyl-containing material to catalyze the reaction is critical in the sense that in its absence the desired reaction between the diglycidylamine and the alkali metal or alkaline earth metal sulfide, hydrosulfide, or hydrogen sulfide may not take place. However, for most purposes, the small amount of hydroxyl-containing material needed to initiate the reaction can be supplied by any source such as those indicated above with no other requirements as to type, amount, etc. being critical. Solvents which can generally be used for this step of the process include the hydrocarbons which are relatively low-boiling solvents having molecular weights no higher than those approximating hexane, heptane, etc., as well as the lower molecular weight alkanols, such as methanol, ethanol, propanol, isopropanol, butanol, tert-butanol, pentanols, hexanol, and mixtures thereof.

The reaction of this invention is preferably conducted at low temperatures, generally from 20° C. to about 50° C. although temperatures on the order of from −20° C. to about 100° C. may be used at atmospheric pressure. Time periods ranging from less than 1 hour to several days or weeks may be used to effect production of the compounds of this invention. Specific time periods within this range can be optimized by those skilled in the art and will vary depending upon the reactants chosen, the solvent, the temperature used, etc.

The reactants are preferably combined in as nearly stoichiometric equimolar proportions as is practically possible for optimum yield of the saturated thiazocinediol product although proportions varying from such stoichiometric proportion may be used with some sacrifice in efficiency of the process. Well known methods of attaining effectively higher dilution such as simultaneous addition of solutions of the reactants to more solvent may provide improved yields.

When the process has proceeded to an extent sufficient to warrant recovery of the product therefrom the reaction mixture may be treated according to conventional chemical techniques to separate the product therefrom, including such techniques as fractional distillation, crystallization, solvent extraction, etc. For example, when the reaction is conducted in the presence of a lower alkanol such as methanol which serves both as an hydroxyl-containing catalyst and as a solvent for the reaction mixture, the alkanol used may simply be removed by fractional distillation under vacuum.

The crude saturated thiazocinediol separated from any solvent is generally at least partially crystalline but may range from liquid to crystalline to gummy residues. The products as prepared are usually mixtures of the cis and trans isomers of the azocinediol compound. Both isomeric forms are prepared by the process of this invention. Liquid products are usually mixtures of the cis and trans isomers. The crystalline fraction of the product may generally be purified by dissolution in a lower alkyl alkanoate ester such as ethyl acetate or combinations with hydrocarbons such as hexane, cyclohexane, heptane, etc. with heating if necessary, cooling, and recrystallizing it. The purification techniques may be repeated several times as necessary to obtain the products in as pure a condition as necessary for the use intended. However, extensive removal of noncrystalline isomers and further purification of the products is not necessary for some applications. For example, when the compounds are used as sanitizers, i.e., as a bacteriostat and/or fungistat, such as in cloth or hand detergent and soap applications, extensive purification is not essential.

The compounds of this invention are useful for a variety of biological toxicant applications, for example as stated above they are useful as sanitizing chemicals, i.e., as bacteriostats either alone or in suitable commercial detergent and wash water rinse compositions in concentrations on the order of about 1 to 10,000 p.p.m. against such organisms as the bacteria *Staphylococcus aureus* and *Salmonella typhosa*. They are also active fungistatic agents against such organisms as *Aspergillus niger* at concentrations ranging from about 1–1000 p.p.m. For example, 1-tert-butylhexahydro - 5 - thi-1-azocine-3,7-diol is effective against bacteria and fungus organisms. These compounds are also useful as intermediates for the preparation of acid salts and esters. The saturated 5-thi-1-azocine-3,7-diols are esterified to the acetate esters of the hydroxyl groups in the 3,7-positions on the ring by treating them with acetic anhydride in pyridine. The amine hydrochloride and amine hydrobromide salts of the compounds may also be prepared by treating the lower alkanol solution of the respective 5-thi-1-azocine-3,7-diol with dilute alcoholic hydrogen halide solutions.

Example 1

This example describes the synthesis and degradative proof of structure of a 1-alkyl-hexahydro-2[H]-5-thi-1-azocine-3,7-diol.

A turbid solution of 24.0 g. of disodium sulfide nonahydrate in 101 g. methanol was treated with 18.5 g. of tert-butylbis(2,3-epoxypropyl)amine at 20° C. with stirring. Within 5 minutes the temperature had risen spontaneously to 40° C. and an ice-bath was required to cool the mixture to 20° C. Titration of an aliquot revealed that 90% of the oxirane content had reacted within fifteen minutes after the addition. After a total of 2 hours at 20–40° C. the reaction was found by titration to be complete.

When neutralized to the phenolphthalein end point with methanolic hydrogen chloride, filtered to remove salt, and aspirated to remove methanol, the mixture gave a wet gum which was dissolved away from the remaining salts with ether. The resulting light yellow dry gum weighed 21.8 g.; it was distilled in a short-path still, distillate being collected at 140°–154° C./up to 1 mm. vacuum. The distilled nearly colorless oil partially crystallized; it was dissolved in an equal volume of hot ethyl acetate and treated with about four volumes of hexane, giving 5.9 g. of colorless impure needles in two crops; M.P. 84–89° C. Recrystallization (3 times) gave pure 1-tert-butyl-hexahydro-2[H]-5-thi-1-azocine-3,7-diol, M.P. 94.5–95° C. This product contained 54.78% carbon, 10.01% hydrogen, 7.01% nitrogen, and 14.93% sulfur; the calculated values were 54.7% carbon, 9.65% hydrogen, 6.39% nitrogen, and 14.6% sulfur.

The first crop of this crude product 3.7 g. was mixed with about 14 g. (dry equivalent) of wet Raney nickel catalyst in 100 ml. of ethanol. After heating the mixture for 2 hours at reflux with stirring an oil was isolated by filtering away the catalyst distilling the solvents and extracting the residue with ether giving principally unchanged starting material. The procedure was repeated using about 11 g. of fresh Raney nickel catalyst in 100 ml. of ethanol; the mixture was refluxed for 27 hours about 7 g. of fresh catalyst being added after 3 hours. The ethanol was slowly allowed to distill until little solvent remained. The isolated oily residue was distilled in a small modified Claisen flask, the third cut, 0.67 g. boiling at 75–100° C. at 1 mm. $n_D^{25}$ 1.4557, being a viscous oil.

A cooled solution of 21.9 g. of tert-butylamine in 100 g. of methanol was treated with 49 g. of propylene oxide, tightly sealed and kept at 20–25° C. After 7 days, the mixture was distilled, finally at 0.3–0.6 mm. The fourth cut, 30.9 g. B.P. 85° (mainly)–95° C., $n_D^{25}$ 1.4558, contained 63.14% carbon, 12.52% hydrogen, and 7.40% nitrogen, compared with 63.4% carbon, 12.6% hydrogen, and 7.40% nitrogen the calculated values. The product was relatively pure tert-butylbis(2-hydroxy - 1 - propyl) amine.

The two samples prepared above were separately subjected to vapor phase chromatography over a 2-ft. 30% Oronite-on-Celite column at 225° C. Both samples contained minor low-boiling contaminants but the major component in each sample gave a symmetrical peak with the same retention time. The liquids corresponding to this peak were collected separately from the two samples at the exit port in tubes cooled with Dry Ice. Their infrared spectra (as neat liquids) were nearly superimposable. That removal of sulfur with replacement by hydrogens gave tert-butylbis(2 - hydroxy-1-propyl)amine conclusively established the assigned structure of the 1-tert-hexahydro-2[H]-5-thi-1-azocine-3,7-diol.

Example 2

To 200 g. of stirred methanol cooled at 0°–5° C. there were added simultaneously and proportionally during 3 hours 10.55 g. (0.050 mole) of N,N-diglycidylcyclohexylamine and, separately, 66.6 ml. of a 1.5 N solution of sodium monosulfide nonahydrate in wet methanol. When the addition was completed, the methanol solvent was stripped off, leaving as residue a crude white solid which was not soluble in water or ether. The solid was filtered and washed with petroleum ether. After purification by recrystallization from petroleum ether, cyclohexane and ethyl acetate, there was obtained 5.88 g. of 1-cyclohexyl-hexahydro-2[H]-5-thi-1-azocine-3,7-diol, which upon further purification from methanol-water solutions had a melting point of 135°–136° C. and analyzed as containing 58.70% carbon, 9.56% hydrogen, 5.81% nitrogen, and 13.29% sulfur as compared with calculated percentages of 58.75% carbon, 9.44% hydrogen, 5.71% nitrogen and 13.05% sulfur.

Example 3

To 400 g. of methanol, stirred and cooled at 0°–5° C., there were slowly added simultaneously and proportionally 20.5 g. (0.100 mole) of N,N-bis(2,3-epoxypropyl) aniline, diluted to 133 ml. with methanol and 133.2 ml. (0.100 mole) of the 1.50 N solution of sodium sulfide·nonahydrate. After removing the methanol, the residue which was mostly solid was collected and dissolved for the most part in ethyl acetate. The crude crystalline product weighed 13.8 g. After recrystallization from ethyl acetate and petroleum ether, the pure product, 1-phenyl-hexahydro-2[H]-5-thi-1-azocine-3,7-diol, melted at 165°–166° C. It analyzed as containing 60.39% carbon, 7.24% hydrogen, 5.91% nitrogen, and 13.53% sulfur as compared with 60.2% carbon, 7.16% hydrogen, 5.85% nitrogen, and 13.40% sulfur, the theoretical values.

Example 4

To 200 gm. of methanol, stirred and kept at 25° C. 11.65 g. (0.050 mole) of N,N-bis(2,3-epoxypropyl)-2,6-dimethylaniline and 66.6 ml. of the 1.50 N sodium sulfide·nonahydrate were added proportionally during 2 hours. When the addition was completed, the solvent was removed under vacuum. The residue was extracted with petroleum ether. Solid remaining dissolved in ethyl acetate. The respective solutions of product were dried with sodium sulfate. After stripping the solvent the residue from the ether extraction was quite viscous. The residue from the ethyl acetate was a filterable solid. Both residues were recrystallized from ethyl acetate. A total of 3.58 g. of crystalline product was obtained. 1-(2,6-dimethylphenyl)-hexahydro-2[H]-5-thi-1-azocine-3,7-diol product purified from an ethyl acetate methanol solution melted at 183°–184° C. (started at 182° C.). It analyzed as containing 62.75% carbon, 7.72% hydrogen, 5.17% nitrogen and 11.82% sulfur as compared with 62.9% carbon, 7.90% hydrogen, 5.23% nitrogen, and 12.0% sulfur, the calculated values.

Example 5

In the manner described in Example 4, 11.75 g. (0.050 mole) of N,N-bis(2,3-epoxypropyl)-2-methoxyaniline and 66.6 ml. of a 1.50 N solution (0.050 mole) of sodium sulfide·nonahydrate were added to 200 gm. of methanol. After removing the solvent and purifying the product, there was obtained 1.51 gm. of 1-(2-methoxyphenyl) hexahydro - 2[H] - 5 - thi - 1-azocine-3,7-diol, M.P. 149°–151° C. which analyzed as containing 57.87% carbon, 7.04% hydrogen, 5.18% nitrogen, and 11.77% sulfur as compared with 58.0% carbon, 7.10% hydrogen, 5.20% nitrogen and 11.9% sulfur, the calculated values.

Example 6

To 100 g. of methanol 6.03 gm. (0.025 mole) of N,N-diglycidyl tert-octylamine and 33.3 ml. of a 1.50 normal solution of sodium sulfide·9H$_2$O (0.025 mole) were slowly added simultaneously and proportionally while stirring and cooling the mixture at 0°–7° C. Most of the methanol was stripped off to obtain 8 g. of crude 1-tert-octyl-hexahydro-2[H]-5-thi-1-azocine-3,7-diol as product. The product was further treated by distillation at reduced pressure, the distillate (4.1 g.) dissolved in petroleum ether and ethyl acetate, but repeated treatment with solvents, cooling, slow evaporation, scratching with a spatula, etc., failed to induce crystallization after several months.

What is claimed is:

1. A compound of the formula

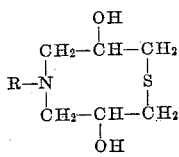

wherein R is selected from the group consisting of alkyl radicals having from 1 to 18 carbon atoms, cycloalkyl radicals having from 3 to 8 carbon atoms, aryl hydrocarbon radicals having from 6 to 12 carbon atoms, aralkyl hydrocarbon radicals having from 7 to 12 carbon atoms, and said radicals substituted with a member of the group consisting of halogen, lower alkyl, formyl, sulfonyl, lower alkoxyl, lower carboalkoxyl, lower alkyl carboxylic acyl, lower aroyl, N-lower alkylcarbamoyl (—C(O)NHR), N,N-di-lower alkylcarbamoyl, and lower acyloxyl (—OC(O)R)

2. A compound as described in claim 1 wherein R is lower alkyl of from 1 to 6 carbon atoms.
3. 1-tert-butylhexahydro - 2[H]-5-thi-1-azocine-3,7-diol.
4. A compound as described in claim 1 wherein R is a cycloalkyl radical having from 3 to 8 carbon atoms.
5. 1-cyclohexyl-hexahydro - 2[H] - 5-thi-1-azocine-3,7-diol.
6. A compound as described in claim 1 wherein R is an aryl hydrocarbon radical having from 6 to 12 carbon atoms.
7. 1-phenyl-hexahydro-2[H]-5-thi-1-azocine-3,7-diol.
8. A compound as described in claim 1 wherein R is an aryl hydrocarbon radical having from 6 to 12 carbon atoms substituted with a lower alkyl radical.
9. 1-(2,6-dimethylphenyl)hexahydro - 2[H] - 5 - thi-1-azocine-3,7-diol.
10. A compound as described in claim 1 wherein R is an aryl hydrocarbon radical having from 6 to 12 carbon atoms substituted with a lower alkoxy radical.
11. 1 - (2 - methoxyphenyl) - hexahydro-2[H]-5-thi-1-azocine-3,7-diol.
12. The process for preparing a saturated azocinediol which comprises contacting and reacting (1) a member of the group consisting of hydrogen sulfide, alkali metal sulfides and hydrosulfides, and alkaline earth metal sulfides, and hydrosulfides, with (2) a diglycidylamine compound of the formula

wherein R is selected from the group consisting of alkyl radicals having from 1 to 18 carbon atoms, cycloalkyl radicals having from 3 to 8 carbon atoms, aryl radicals having from 6 to 12 carbon atoms, aralkyl radicals having from 7 to 12 carbon atoms, and said radicals substituted with non-interfering groups such as halogen, lower alkyl, formyl, sulfonyl, lower alkoxyl, lower carboalkoxyl, lower acyl, lower aroyl, N-lower alkylcarbamoyl, N,N-di-lower alkylcarbamoyl, and lower alkyl carboxylic acyloxyl in the presence of an hydroxyl-containing compound, at a temperature of from about −20° C. to about 100° C.

13. The process as described in claim 12 wherein reactant (1) is an alkali metal sulfide, and reactant (2) is a diglycidylamine wherein R is an alkyl radical having from 1 to 18 carbon atoms.
14. The process for preparing 1-tert-butylhexahydro-2[H]-5-thi-1-azocine-3,7-diol which comprises contacting and reacting N,N-diglycidyl-tert-butylamine with sodium sulfide in the presence of an hydroxyl-containing catalyst at a temperature of from about 25° to about 50° C.
15. The process as described in claim 11 wherein reactant (1) is an alkali metal sulfide, and reactant (2) is a diglycidylamine where R is an aryl hydrocarbon radical having from 6 to 12 carbon atoms.
16. The process for preparing 1-phenyl-hexahydro-2[H]-5-thi-1-azocine-3,7-diol which comprises contacting and reacting N,N-diglycidylaniline with sodium sulfide in the presence of an hydroxyl-containing catalyst at a temperature of from about 0° to 5° C.
17. The process as described in claim 12 wherein reactant (1) is an alkali metal sulfide and reactant (2) is a diglycidylamine where R is a cycloalkyl radical having from 3 to 8 carbon atoms.
18. The process for preparing 1-cyclohexylhexahydro-2[H]-5-thi-1-azocine-3,7-diol which comprises contacting and reacting N,N-diglycidylcyclohexylamine with sodium sulfide in the presence of an hydroxyl-containing catalyst at 0° to 5° centigrade.

References Cited

UNITED STATES PATENTS 3,236,837   2/1966   Gaertner _____ 260—239

JAMES A. PATTEN, *Primary Examiner.*